(12) United States Patent
Schweiher et al.

(10) Patent No.: US 7,861,839 B2
(45) Date of Patent: Jan. 4, 2011

(54) TRANSMISSION LOCK

(75) Inventors: Mark Schweiher, Lauffen (DE); Lothar Herdle, Pfedelbach (DE); Armin Flaig, Schwaebisch Hall (DE)

(73) Assignee: GETRAG Getriebe-und Zahnradfabrik Hermann Hagenmeyer GmbH & Cie KG, Untergruppenbach (DE)

( * ) Notice: Subject to any disclaimer, the term of this patent is extended or adjusted under 35 U.S.C. 154(b) by 802 days.

(21) Appl. No.: 11/741,661

(22) Filed: Apr. 27, 2007

(65) Prior Publication Data

US 2007/0283735 A1 Dec. 13, 2007

(30) Foreign Application Priority Data

May 12, 2006 (DE) ...................... 10 2006 022 963

(51) Int. Cl.
*B60W 10/10* (2006.01)
(52) U.S. Cl. .................... 192/220.2; 74/335; 74/473.26
(58) Field of Classification Search ........................ None
See application file for complete search history.

(56) References Cited

U.S. PATENT DOCUMENTS

| | | | |
|---|---|---|---|
| 3,610,004 A | | 10/1971 | Neese |
| 3,906,817 A | * | 9/1975 | Kreitzberg ................... 74/745 |
| 5,020,344 A | * | 6/1991 | Garcia ......................... 70/245 |
| 5,566,581 A | * | 10/1996 | Smale et al. ............. 74/473.22 |
| 6,124,789 A | | 9/2000 | Barr |
| 6,588,294 B1 | * | 7/2003 | Rogg ...................... 74/473.21 |
| 7,694,795 B2 | * | 4/2010 | Berger et al. ............. 192/219.5 |

FOREIGN PATENT DOCUMENTS

| | | |
|---|---|---|
| DE | 4127991 C2 | 2/1993 |
| DE | 19804640 A1 | 8/1999 |
| DE | 19834156 A1 | 2/2000 |
| DE | 10037565 A1 | 4/2002 |
| DE | 10212038 A1 | 10/2003 |
| DE | 102 45 386 | 4/2004 |
| DE | 10245386 A1 | 4/2004 |
| DE | 102004021981 A1 | 11/2004 |
| EP | 0 895 908 | 2/1999 |
| EP | 0895908 A1 | 2/1999 |
| EP | 1 679 456 | 7/2006 |
| JP | 2-212246 | 8/1990 |
| JP | 02212246 A | 8/1990 |
| WO | WO 03/095871 | 11/2003 |

* cited by examiner

*Primary Examiner*—David D Le
*Assistant Examiner*—Justin Holmes
(74) *Attorney, Agent, or Firm*—Knobbe, Martens, Olson & Bear, LLP

(57) ABSTRACT

A lock arrangement for a transmission, in particular in the form of a parking-lock arrangement for an automated transmission. The lock arrangement is prestressed by a first spring accumulator into a locking position in which the transmission is locked. The lock arrangement is capable of being shifted by means of an actuator from the locking position into a release position in which the transmission is released. The lock arrangement has an electronically activatable blocking device which is designed for blocking the lock arrangement mechanically in the locking position.

19 Claims, 4 Drawing Sheets

TRANSMISSION LOCK

BACKGROUND OF THE INVENTION

The present invention relates to a lock arrangement for a transmission, in particular a parking-lock arrangement for an automated transmission, the lock arrangement being prestressed by a first spring accumulator into a locking position in which the transmission is locked, and the lock arrangement being capable of being shifted by means of an actuator from the locking position into a release position in which the transmission is unlocked.

Parking-lock arrangements of this type are known for automatic transmissions, including automatic converters, automated shift transmissions, double clutch transmissions, etc.

The present invention relates, furthermore, to a method for activating such a lock arrangement.

DE 41 27 991 C2 discloses a parking lock for an automatic transmission, with a spring accumulator which generally presses the parking lock into the locking position, and with an electrohydraulic actuator, by means of which the parking lock can be pressed into the release position. To hold the release position, a pressure-medium accumulator may be provided. In a modification, a mechanical bistable flip-flop is provided, which retains the parking lock mechanically in both positions. Pressure medium is then necessary only for changes in the positions. A position sensor detects the position of the parking lock.

DE 10 2004 021 981 A1 shows a parking lock with a spring accumulator for setting the locking position and with a release device for setting the release position. An electromagnetic holding device holds the parking lock in the release position. The release device can be actuated by means of a transmission actuator.

A parking lock with a holding device for holding the parking lock in the release position is also known from DE 198 34 156 A1, DE 102 12 038 A1 and DE 100 37 565 A1. By the electronic actuation of the holding device, the holding device is released and the parking lock is transferred into the locking position by means of a spring accumulator. In this case, there may be provision for monitoring the position by means of a sensor.

DE 198 34 156 A1 and DE 100 37 565 A1 in this case show solutions for transferring the parking lock into the locking position by means of a fluid actuator. For this purpose, the parking lock of DE 102 12 038 A1 uses an electric motor.

Furthermore, DE 198 04 640 A1 also shows a parking lock, in which the position is checked electronically. If a fault is detected, an actuator-actuable parking brake is actuated.

BRIEF SUMMARY OF THE INVENTION

Against this background, the object of the invention is to specify a transmission lock which is improved particularly in terms of safety.

In the lock arrangement mentioned in the introduction, this object is achieved in that the lock arrangement has an electronically activatable blocking device which is designed for blocking the lock arrangement mechanically in the locking position.

By means of the blocking device, it is possible with a higher degree of reliability to prevent the release of the parking lock. Particularly when the motor vehicle is stopped on a gradient, this may present safety problems in the prior art, especially when the driver forgets to actuate a parking brake.

Additional safety can be provided in this respect by means of the blocking device. Should the actuator be activated inadvertently (for example because of a control error or the like), so as to shift the locking arrangement into the release position, this is prevented by the blocking device.

The actuator for shifting the lock arrangement from the locking position into the release position can be a fluid actuator, in particular an electrohydraulic cylinder, although the actuator may also be formed by an electric motor or an electromagnet or the like.

By the blocking device being activatable electronically, the lock arrangement can have a simple construction, essentially no modifications being necessary, as compared with conventional designs.

The blocking device according to the invention may preferably also be used for blocking the lock arrangement mechanically in the release position. In this case, the blocking device also acts as a holding device which holds the lock arrangement in the release position counter to the force of the first spring accumulator. As a result, energy for activating the actuator, in particular pressure energy of a fluid actuator, can be saved, since the actuator does not have to be constantly supplied with energy in the release position in order to hold the first spring accumulator in the tensioned state.

Preferably, the blocking device has a blocking member which can be shifted between a blocking position and an unblocking position by means of an electronically activatable actuating member, the blocking member blocking the lock arrangement positively in the blocking position.

As a result of positive blocking, a shift of the lock arrangement into the release position is ruled out even when the actuator is activated with relatively high force.

It is particularly preferred, in this case, if the blocking member is prestressed into the unblocking position by means of a second spring accumulator.

By virtue of this measure, the parking lock can be designed such that an automatic interlocking of the drive train is possible in the event of the absence of activation of the lock arrangement or of the blocking device. This applies particularly when the blocking device is also preferably used in order to block the lock arrangement mechanically in the release position.

Alternatively, it is also possible to prestress the blocking member into the blocking position by means of a second spring accumulator.

With this embodiment, it is possible to hold or block the lock arrangement in each case in the locking position or the release position, without energy having to be supplied. A supply of energy is necessary solely in the event of variations in position, in order to shift the blocking member into the unblocking position.

The actuating member for shifting the blocking member may be implemented, for example, by an electromechanical active mechanism, such as, for example, a moving coil, a proportional magnet, an actuating or stepping drive or the like.

According to a further preferred embodiment, the blocking member has a low friction section for shifting the blocking member from the blocking position into the unblocking position with low friction.

As a result, the force required for canceling the blocking action can be reduced to a necessary minimum.

The low friction section may in this case be configured such that the mutually contacting surfaces of the blocking member, on the one hand, and of the lock arrangement, on the other hand, are of low-friction design (by means of corresponding surface treatment, for example metallic or nonmetallic coatings).

It is particularly preferred, however, if the blocking member has a low friction section including rotatably mounted rolling body, in order to shift the blocking member from the blocking position into the unblocking position with low friction.

According to a further preferred embodiment, the lock arrangement has a first locking member which is firmly connected to a power take-off of the transmission, and a second locking member which is movably supported at a housing of the transmission.

The first locking member may in this case be, for example, a conventional parking-lock wheel with a toothing (for example, on the outer circumference, but also on an axial surface or the like). The second locking member may be, for example, a parking-lock pawl which is restressed into the release position by means of a third spring accumulator.

In general, it is possible to bring the first and the second locking member frictionally into engagement with one another in the locking position.

It is preferred, however, that the first and the second locking member are brought positively into engagement with one another in the locking position, in order to connect the power take-off to the housing and consequently to lock the transmission. Correspondingly, the first and the second locking member are preferably released from one another in the release position in order to release the power take-off.

According to an embodiment, preferred overall, the blocking device engages on the second locking member in order to block the lock arrangement mechanically.

The blocking device can be integrated into an existing parking-lock arrangement in a structurally simple way by virtue of this measure. Further additional components are, as a rule, not required.

Furthermore, engagement on the second locking member ensures that the blocking device acts directly on one of the locking components, so that increased safety is afforded.

Alternatively, however, it is also possible that the blocking device engages on an actuating member of the actuator in order to block the lock arrangement mechanically.

In this case, too, it is possible in a structurally simple way to integrate the blocking device. Furthermore, it is comparatively simple to use the blocking device both for blocking in the locking position and for holding in the release position.

Furthermore, it is advantageous if a first position sensor is provided, which detects whether the lock arrangement is in the locking position or in the release position.

By means of the position sensor, in a control device, a decision as to whether the blocking device is to be actuated or not can be made as a function of the position of the lock arrangement. It is also possible to prevent an actuation of the blocking device when the lock arrangement is neither in the locking position nor in the release position.

It is particularly preferred if a control device has an interrogation section in order, after the shift of the lock arrangement into the locking position, to ascertain whether a supply device for supplying the actuator is still in operation and, if so, to activate the blocking device to block the lock arrangement.

In this embodiment, it is possible to use the blocking device when, because of the operation of a fluid supply device, there is generally still the risk that the fluid actuator is actuated in order to release the lock arrangement again.

For example, when the vehicle is stopped, with the engine running, a fault in a fluid supply system could occur, with the result that the parking lock could be released and, consequently, the vehicle could roll on.

Since a fluid actuator is often activated electromagnetically, a small pulse could consequently be sufficient in the prior art to cause the pressure in the fluid actuator to rise, so that the lock arrangement is released inadvertently.

This can be prevented by the inventive blocking device, since this is activated when such a fluid supply device is still in operation when the lock arrangement is shifted into the locking position.

Such a concept can also be adopted in other actuators (for example, electromagnets or electric motors), in that the interrogation section ascertains whether there is, in general, still the possibility that the actuator is activated inadvertently (for example, when a corresponding electrical supply circuit is still active).

According to a further preferred embodiment, there is provision whereby, when, after the shift of the lock arrangement into the locking position, the interrogation section ascertains that the supply device for supplying the actuator is not in operation, the control device does not activate the blocking device to block the lock arrangement or activates the blocking device for transferring into the unblocking position.

What is achieved thereby is that the blocking device does not become operative or is put out of operation when, on account of the inactivity of the supply device, there is no risk that the actuator is actuated counter to the spring prestress of the first spring accumulator. For this situation, the action of the first spring accumulator is provided, in order to hold the lock arrangement in the locking position.

In a method according to the invention for activating a lock arrangement according to the invention, the steps are provided of ascertaining, after the shift of the lock arrangement into the locking position, whether a supply device for supplying the actuator is in operation and, if so, of activating the blocking device for blocking the lock arrangement, and, when it is ascertained that the supply device is not in operation, for not activating the blocking device to block the lock arrangement or for activating the blocking device so as not to block the lock arrangement.

Overall, the lock arrangement according to the invention can preferably be used in automatic or automated vehicle transmissions with a starting or shift clutch which is open in the unactuated state, for example in conjunction with a hydraulic or pneumatic control.

According to the invention, the blocking device is used for securing the lock arrangement, particularly when the engine is running or when a supply device for an actuator for actuating the lock arrangement into the release position is still active. To hold the lock arrangement in the release position, a separate holding device may be provided, such as is also proposed in the prior art mentioned in the introduction. It is preferably also possible, however, to use the blocking device also for performing the holding function.

Furthermore, it is possible to provide a mechanical unlocking device which enables the driver to shift the lock device out of the locking position into the release position. Such a type of emergency unlocking is advantageous, for example, when the vehicle has to be towed away when the control is not operationally ready, in the event of a failure of the on-board voltage supply, etc.

It will be appreciated that the features mentioned above and those yet to be explained below may be used not only in the combination specified in each case, but also in other combinations or alone, without departing from the scope of the present invention.

BRIEF DESCRIPTION OF THE SEVERAL VIEWS OF THE DRAWING

Exemplary embodiments of the invention are illustrated in the drawing and are explained in more detail in the following description. In the drawing.

DETAILED DESCRIPTION OF THE INVENTION

Figure 1:
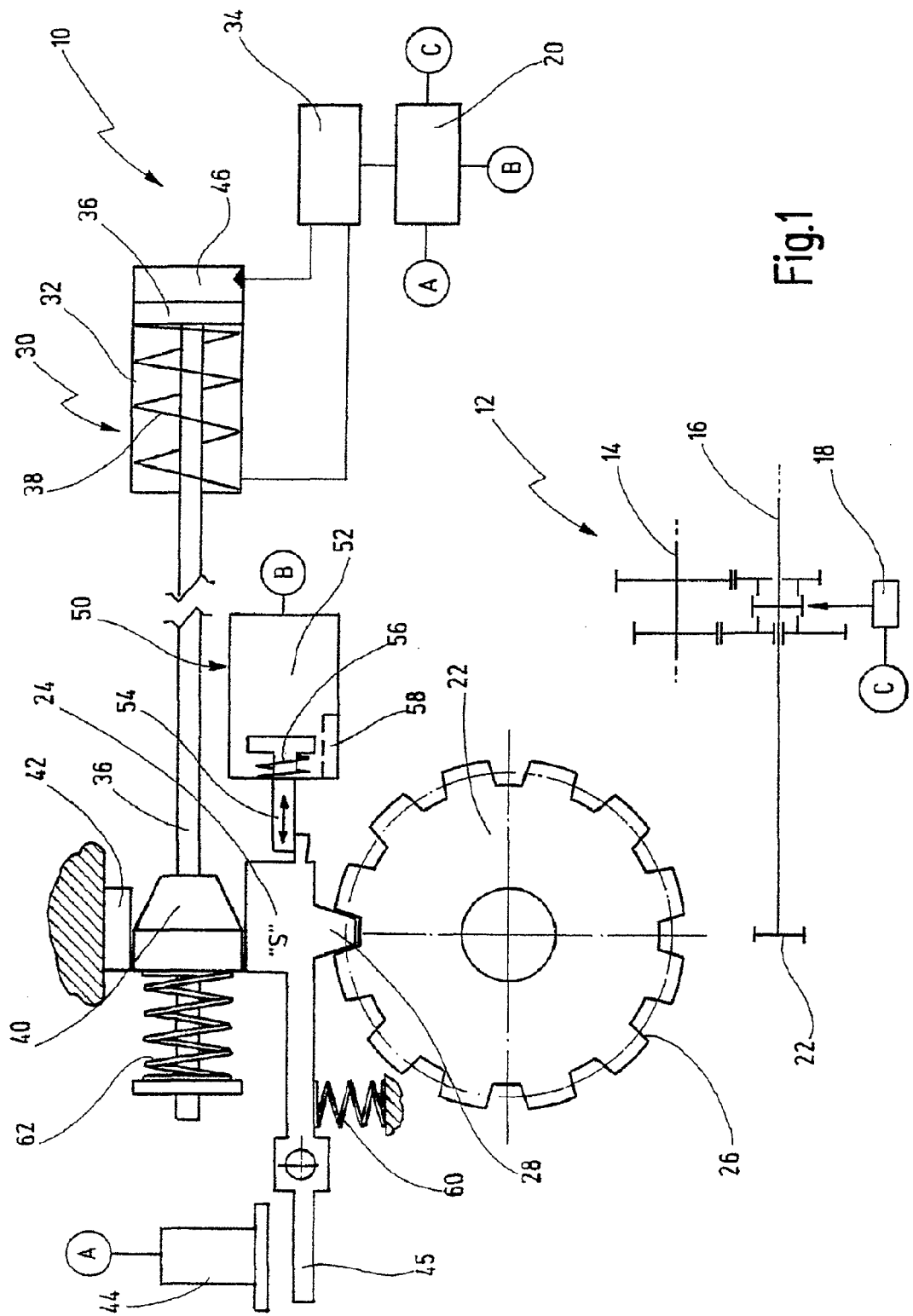
FIG. 1 shows a diagrammatic view of a motor vehicle transmission with a parking-lock arrangement according to the invention in a locking position.

A first embodiment of a parking-lock arrangement according to the invention is designated in general by 10 in FIG. 1.

The lock arrangement 10 is designed as a parking-lock arrangement for an automated transmission 12. The automated transmission 12, in the case illustrated, is designed, for example, as a countershaft transmission, by means of which, for example, two or more wheel sets can be shifted alternately into the force flux by means of respective shift-clutch assemblies.

The transmission has an input shaft 14 and an output shaft 16. The input shaft 14 is connected, for example via a starting clutch or a double-clutch assembly, to an engine, such as an internal combustion engine. The output shaft 16, as a rule, is connected positively to driving wheels of the motor vehicle and constitutes a power take-off.

A shift-clutch assembly can be actuated in. each case by means of a shift actuator 18. The shift actuator 18 is connected to an overriding control device 20 which is responsible, for example, for selecting and deselecting gear steps, for actuating the starting clutch, etc.

The control device 20 also serves for activating the parking-lock arrangement 10.

The parking-lock arrangement 10 has a first locking member 22 in the form of a parking-lock wheel with external toothing. The parking-lock wheel 22 is connected fixedly in terms of rotation to the output shaft 16.

Furthermore, the parking-lock arrangement 10 has a second locking member 24 in the form of a locking pawl. The locking pawl 24 is illustrated in FIG. 1 in a locking position "S", in which a projection of the locking pawl engages into the external toothing of the locking wheel 22. The second locking member 24 is supported at the housing, so that, in the locking position S, the output shaft 16 is locked positively with respect to the housing of the transmission 12.

The external toothing of the first locking member 22 is shown at 26 in FIG. 1. A projection or tooth of the second locking member 24 is designated by 28 in FIG. 1.

The parking-lock arrangement 10 can be actuated by means of an actuator arrangement designated as a whole by 30.

The actuator arrangement 30 has a fluid actuator 32 in the form of a single-acting hydraulic or pneumatic cylinder. The fluid actuator 32 can be activated by means of a fluid supply device 34 which is connected to the control device 20.

The fluid actuator 32 has an actuating member 36 which contains a piston and a piston rod. The actuating member 36 is prestressed into the locking position S by means of a first spring accumulator 38.

Mounted on the actuating member is a locking cone 40 which, in the locking position S, is pushed between the second locking member 24 and a housing 42 of a transmission 12 and, in this position, prevents the second locking member 24 from coming loose from the external toothing 26 of the first locking member 22.

A first position sensor which is connected to the control device 20 is shown at 44. The first position sensor 44 detects the position of the second locking member 24, specifically by means of an extension 45 on the second locking member 24. It should be appreciated, however, that the position sensor 44 may be mounted at any desired location, provided that it can detect the position of the second locking member, that is to say whether the latter is in the locking position S or in a release position F still to be described.

The fluid actuator 32 has a pressure space 46, into which a pressure medium can be introduced by means of the fluid supply device 34, in order to displace the actuating member 36, counter to the force of the first spring accumulator 38, out of the locking position S into the release position F still to be described.

In so far as the parking-lock arrangement 10 is shifted into the locking position S, for example when the engine of the motor vehicle is running, there could generally be the risk that the pressure space 46 is inadvertently filled with pressure medium on account of a fault or the like in the control device 20 or in the fluid supply device 34. This would lead to the parking-lock arrangement 10 inadvertently being shifted from the locking position S into the release position F, so that a vehicle could automatically roll on on a descending gradient.

This is prevented, in the present case, by a blocking device 50.

The blocking device 50 has an actuating member 52 which is connected to the control device 20. Furthermore, the blocking device 50 has a blocking member 54 which can be shifted between a blocking position (illustrated in FIG. 1) and an unblocking position by means of the actuating member 52.

In the blocking position shown, a blocking member 54 engages positively behind an extension of the second locking member 24, so that the locking position S is maintained, even if the fluid actuator 32 were to be inadvertently actuated such that the locking cone 40 releases the second locking member 24.

Furthermore, FIG. 1 illustrates the option whereby the blocking device 50 has a second spring accumulator 56, by means of which the blocking member 54 is generally prestressed into the unblocking position. In the unblocking position, the blocking device does not influence the lock arrangement. In order to shift the blocking member 52 into the blocking position shown, therefore, it is necessary for the actuating member 52 to be activated via the control device 20.

Furthermore, FIG. 1 shows an optional second position sensor 58 which monitors the position of the blocking member 54. It should be appreciated that the second position sensor 58 is also connected to the control device 20.

Figure 2:
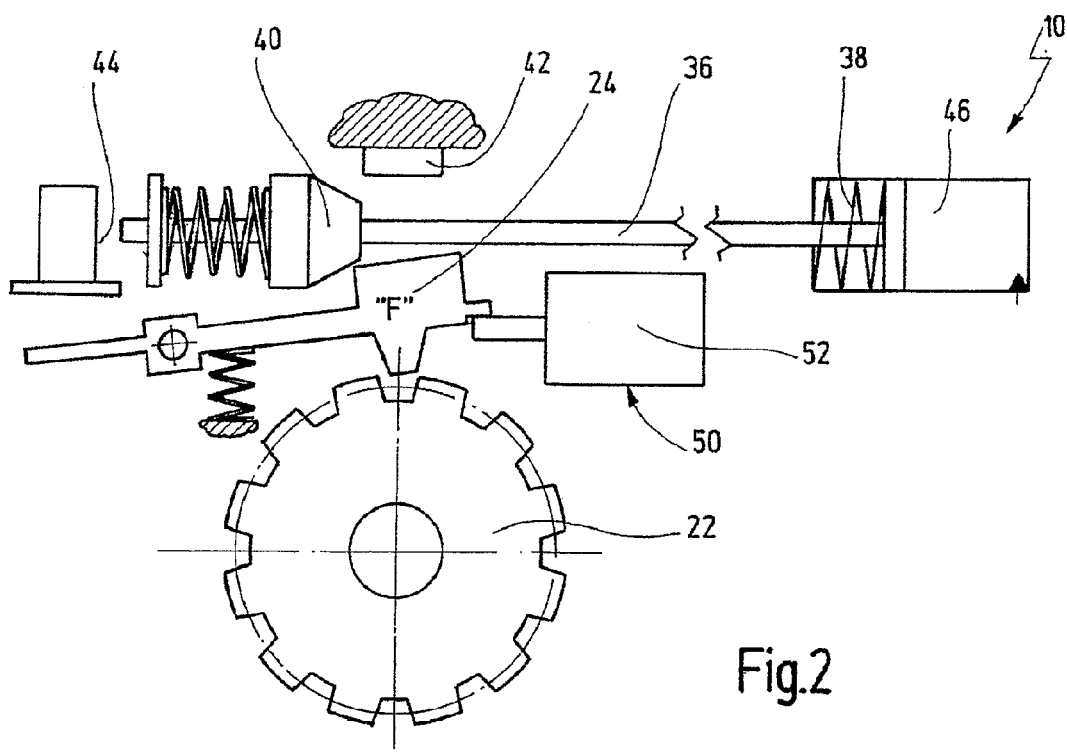
FIG. 2 shows the parking-lock arrangement of FIG. 1 in a release position.

Furthermore, FIG. 1 illustrates a third spring accumulator 60, by means of which the second locking member 24 is generally pressed into the release position "F", as illustrated in FIG. 2.

The third spring accumulator 60 is dimensioned such that it exerts a lower force on the second locking member 24 than the first spring accumulator 38 and a fourth spring accumulator 62, respectively.

The fourth spring accumulator 62 serves for absorbing energy for the situation where the actuating member 36 is shifted (by means of the first energy accumulator 38), but there is no projection 28 located above a corresponding depression of the external toothing 26, so that the second locking member 24 cannot move into the locking position S. The fourth spring accumulator 62 consequently assists the action of the first spring accumulator 38.

As soon as the output shaft 16 is moved somewhat, the fourth spring accumulator 62 then presses the locking cone 40 into the locking position, specifically counter to the force of the third spring accumulator 60.

In the parking-lock arrangement 10 according to the invention, the second locking member 24 is blocked in the locking position S by means of the blocking device 50. Even if the pressure space 46 were to be filled on account of a fault, the locking position S would not be released.

As soon as the energy supply is switched off and to that extent that pressure also can no longer build up from the fluid supply device (that is to say, the risk of inadvertent actuation is eliminated), the activation of the blocking device 50 can also be canceled. In this case, the blocking member 54 is shifted automatically into the unblocking position by means of the second spring accumulator 56. The second locking member 24 would then be held in the locking position solely by means of the first spring accumulator 38. Only when the energy supply is switched on again is the blocking member 54 shifted into the blocking position again until an appropriate command from the control device for selecting the release position is obtained. In this case, first, the blocking device 50 is switched off and, subsequently, the pressure space 46 is filled, so that the locking cone 40 is shifted into the release position, in which the third spring accumulator 60 can release the second locking member 24 out of the locking position S, so that the release position "F" shown in FIG. 2 is established.

In order to prevent the pressure space 46 from being acted upon constantly during operation, the blocking device 50 may also be used in order to hold the second locking member 24 in the release position F shown, in that the blocking member 54 is shifted into the blocking position and once again engages behind the projection of the second locking member 24 (this time, however, from the other side).

Figure 3:
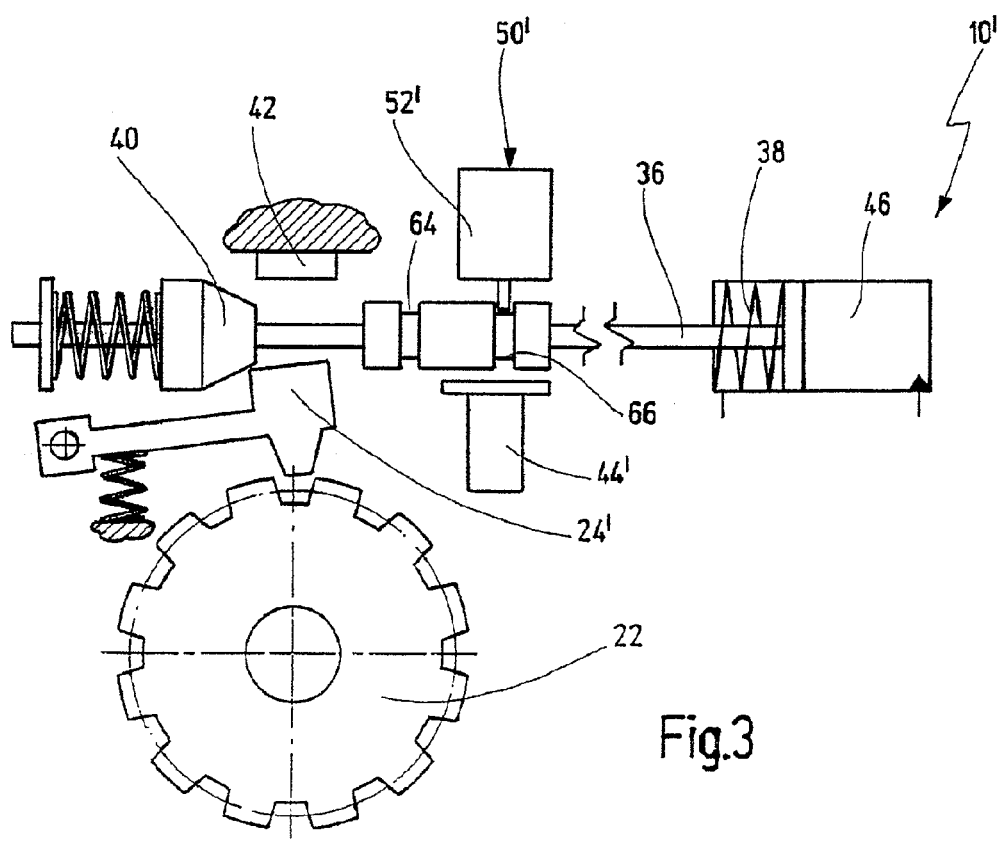
FIG. 3 shows a view, corresponding to FIG. 2, of an alternative embodiment of a parking-lock arrangement according to the invention.

FIG. 3 shows an alternative embodiment 10' of a parking-lock arrangement according to the invention.

In general, in terms of functioning and construction, the parking-lock arrangement 10' of FIG. 3 corresponds to the parking-lock arrangement 10 of FIGS. 1 and 2. Identical elements are therefore identified by the same reference symbols. Only differences are illustrated below.

FIG. 3 shows the parking-lock arrangement 10' in a release position, in which the blocking device 50' is used for holding the release position. In this case, the actuating member 36 has provided on it a radial circumferential groove 66, into which the blocking member of the blocking device 50' engages. A further, axially offset radial groove 64 serves for holding the actuating member 36 in the locking position.

Figure 4:
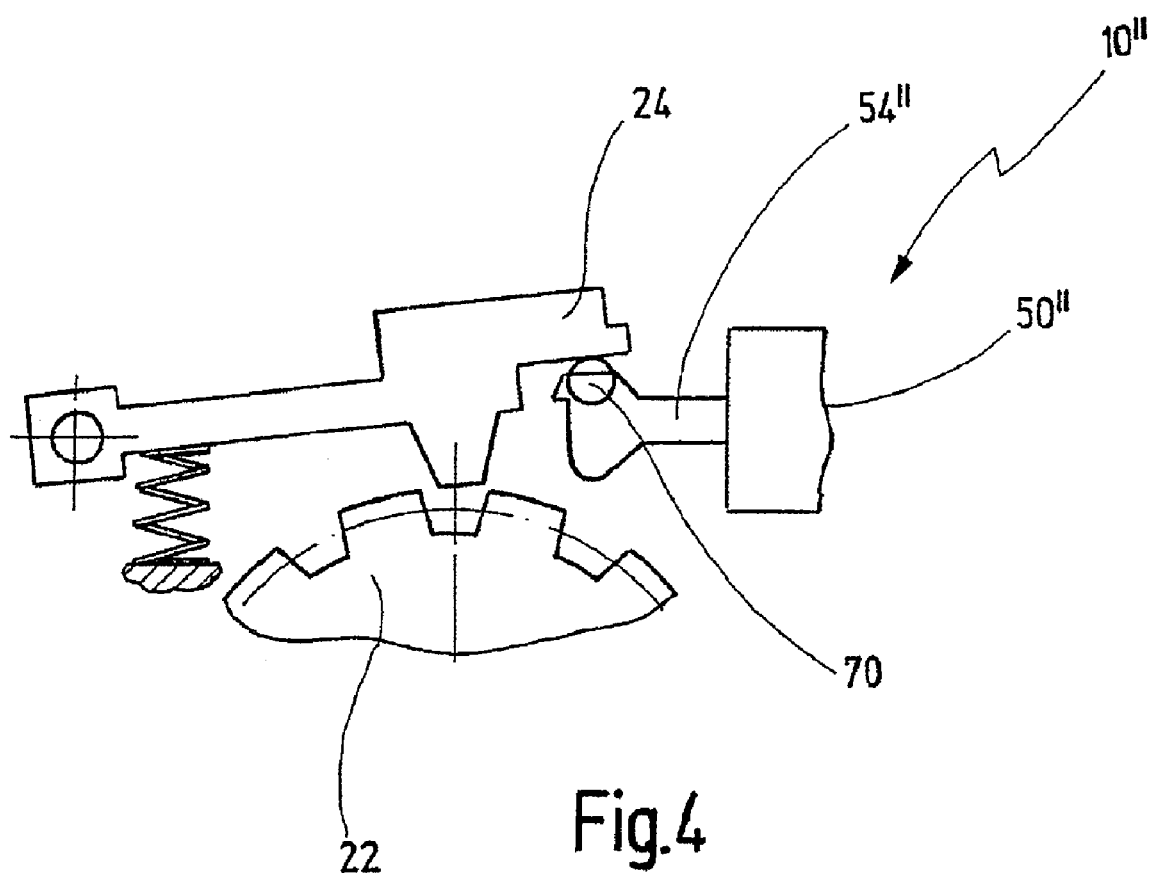
FIG. 4 shows a modification of a parking-lock arrangement according to the invention.

FIG. 4 shows a modification of a parking-lock arrangement 10" according to the invention.

In general, in terms of functioning and construction, the parking-lock arrangement 10" corresponds to the parking-lock arrangement 10 of FIG. 1. Only differences are explained below.

For example, the blocking member 54" of the blocking device 50" of the parking-lock arrangement 10" has a rolling body 70.

The rolling body 70, in the blocking position, engages on the second locking member 24. In so far as the blocking member 54" is to be shifted into the unblocking position, this may take place with low friction, in that the rolling body 70 rolls on the second locking member 24.

Since the frictional forces arising are relatively low when the blocking member 54" blocks the locking position, no second rolling body is required for support.

Furthermore, as an alternative for each of the above embodiments, the contacting surfaces of the blocking member 54 and of the counter member, respectively, may be provided with low-friction coatings (metallic or non-metallic).

Figure 5:
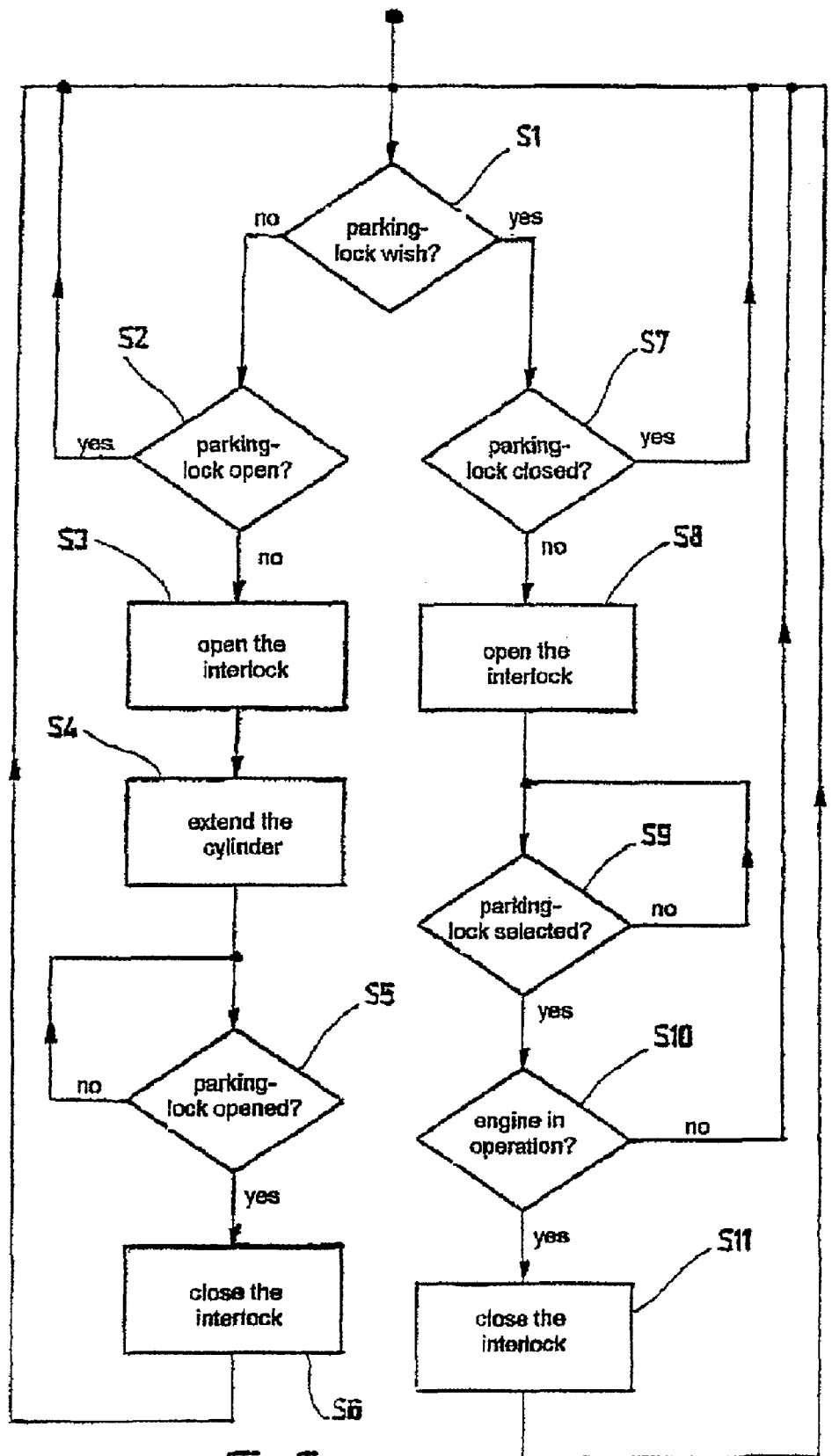
FIG. 5 shows an embodiment of a method according to the invention for activating a lock arrangement for the transmission.

In FIG. 5, an embodiment of a method according to the invention for activating a lock arrangement according to the invention is designated in general by 80. The method is illustrated in the form of a flow chart and is explained below by means of the individual steps.

The method may be implemented, for example, on the control device 20, in the form of an electronic program which runs in a continuous loop.

At the start, in a step S1, it is interrogated as to whether the parking lock is to be selected. In so far as this is not so, a check is made, in a step S2, as to whether the parking-lock arrangement is in the release position. If this is so, the program returns to the starting point. If the parking-lock arrangement 10 is not in the release position, in step S3 the parking-lock arrangement is shifted from the locking position S into the release position F.

For this purpose, in step S4, for example, the fluid actuator 32 is activated such that the pressure space 46 is filled so that the actuating member 36 is shifted into the release position.

In step S5, it is monitored as to whether the release position is reached. This takes place until this is actually the case.

In step S6, with the release position F reached, the blocking device 50 is actuated (the interlock is closed), so that pressure does not constantly have to be maintained in the pressure space 46.

In so far as, in step S1, there is the desire for a parking lock, in step S7 it is interrogated whether the parking-lock arrangement is in the locking position. If this is so, the process returns to the starting point.

In so far as the locking position S is not reached, first, the blocking device is brought into the unblocking position (the interlock is opened), specifically in step S8.

Subsequently, in step S9, it is interrogated whether the parking lock is in the locking position, specifically until this is actually the case.

Subsequently, in step S10, it is interrogated whether the engine of the motor vehicle is still in operation. As the supply device for supplying the actuator is inoperative if the engine is not in operation, this is to interrogate whether the supply device is still in operation. If this is not so, the blocking device 50 is not activated and the process returns to the starting point. As an alternative, it can be interrogated in step S10 directly whether a supply device for supplying the actuator is still in operation.

If, however, the engine (the supply device) is still in operation, the blocking device 50 is shifted into the blocking position (the interlock is closed), specifically in step S11.

What is claimed is:

1. A parking lock arrangement for a transmission, the lock arrangement being prestressed by a first spring accumulator into a locking position in which the transmission is locked, and the lock arrangement being capable of being shifted by means of an actuator from the locking position into a release position in which the transmission is released, wherein the lock arrangement has an electronically activatable blocking device which is designed for blocking the lock arrangement mechanically in the locking position independent of the position of the actuator.

2. The lock arrangement according to claim 1, wherein the blocking device has a blocking member which can be shifted between a blocking position and an unblocking position by means of an electronically activatable actuating member, the blocking member blocking the lock arrangement positively in the blocking position.

3. The lock arrangement according to claim 2, wherein the blocking member is prestressed into the unblocking position by a second spring accumulator.

4. The lock arrangement according to claim 2, wherein the blocking member is prestressed into the blocking position by means of a second spring accumulator.

5. The lock arrangement according to claim 2, wherein the blocking member has a low friction section for shifting the blocking member from the blocking position into the unblocking position with low friction.

6. The lock arrangement according to claim 5, wherein the blocking member has a rotatably mounted rolling body in order to shift the blocking member from the blocking position into the unblocking position with low friction.

7. The lock arrangement according to claims 1, wherein the lock arrangement has a first locking member, which is firmly connected to a power take-off of the transmission, and a second locking member which is movably supported at a housing of the transmission.

8. The lock arrangement according to claim 7, wherein the first and the second locking member are brought positively into engagement with one another in the locking position, in order to connect the power take-off to the housing and consequently to lock the transmission.

9. The lock arrangement according to claim 7, wherein the first and the second locking member are released from one another in the release position, in order to release the power take-off.

10. The lock arrangement according to claim 7, wherein the blocking device engages on the second locking member in order to block the lock arrangement mechanically.

11. The lock arrangement according to claim 7, wherein the blocking device engages on an actuating member of the actuator in order to block the lock arrangement mechanically.

12. The lock arrangement according to claim 1, comprising a first position sensor which detects whether the lock arrangement is in the locking position or in the release position.

13. The lock arrangement according to claim 1, wherein a control device has an interrogation section in order, after the shift of the lock arrangement into the locking position, to ascertain whether a fluid supply device for supplying the fluid actuator is still in operation, and, if so, activates the blocking device to block the lock arrangement.

14. The lock arrangement according to claim 13, wherein, when, after the shift of the lock arrangement into the locking position, the interrogation means ascertain that the fluid supply device for supplying the fluid actuator is not in operation, the control device does not activate the blocking device to block the lock arrangement.

15. A method for activating a parking lock arrangement, with the steps of ascertaining, after the shift of a lock arrangement into a locking position, whether a supply device for supplying an actuator for the lock arrangement is in operation, and, if so, of activating a blocking device to block the lock arrangement, and then, when, after the shift of the lock arrangement into the locking position, it is ascertained that the supply device for supplying the actuator is not in operation, not activating the blocking device to block the lock arrangement.

16. A method for activating a parking lock arrangement for a transmission, the lock arrangement being prestressed by a first spring accumulator into a locking position in which the transmission is locked, and the lock arrangement being capable of being shifted by means of an actuator from the locking position into a release position in which the transmission is released, wherein the lock arrangement has an electronically activatable blocking device which is designed for blocking the lock arrangement mechanically in the locking position, the method comprising the steps of ascertaining, after the shift of the lock arrangement into the locking position, whether a supply device for supplying the actuator is in operation, and, if so, of activating the blocking device to block the lock arrangement, and then, when, after the shift of the lock arrangement into the locking position, it is ascertained that the supply device for supplying the actuator is not in operation, not activating the blocking device to block the lock arrangement.

17. A parking lock arrangement for a transmission, the lock arrangement being prestressed by a first spring accumulator into a locking position in which the transmission is locked, and the lock arrangement being capable of being shifted by means of an actuator from the locking position into a release position in which the transmission is released, wherein the lock arrangement has an electronically activatable blocking device which is designed for blocking the lock arrangement mechanically in the locking position independent of the position of the actuator, wherein the blocking device is actuated to block the lock arrangement only if there is a risk that the actuator is actuated counter the prestress of the first spring accumulator although the lock arrangement has been shifted in the locking position.

18. The lock arrangement according to claim 17, wherein a control device has an interrogation section in order, after the shift of the lock arrangement into the locking position, to ascertain whether a fluid supply device for supplying the fluid actuator is still in operation, and, if so, activates the blocking device to block the lock arrangement.

19. A parking lock arrangement for a transmission, the lock arrangement being prestressed by a first spring accumulator into a locking position in which the transmission is locked, and the lock arrangement being capable of being shifted by means of an actuator from the locking position into a release position in which the transmission is released, wherein the lock arrangement has an electronically activatable blocking device which is designed for blocking the lock arrangement mechanically in the locking position, wherein a control device has an interrogation section in order, after the shift of the lock arrangement into the locking position, to ascertain whether a fluid supply device for supplying the fluid actuator is still in operation, and, if so, activates the blocking device to block the lock arrangement.

* * * * *